Nov. 2, 1937.  A. E. NORTHUP ET AL  2,097,699
METHOD OF CONSTRUCTING VEHICLE BODIES
Filed June 2, 1933   2 Sheets-Sheet 1
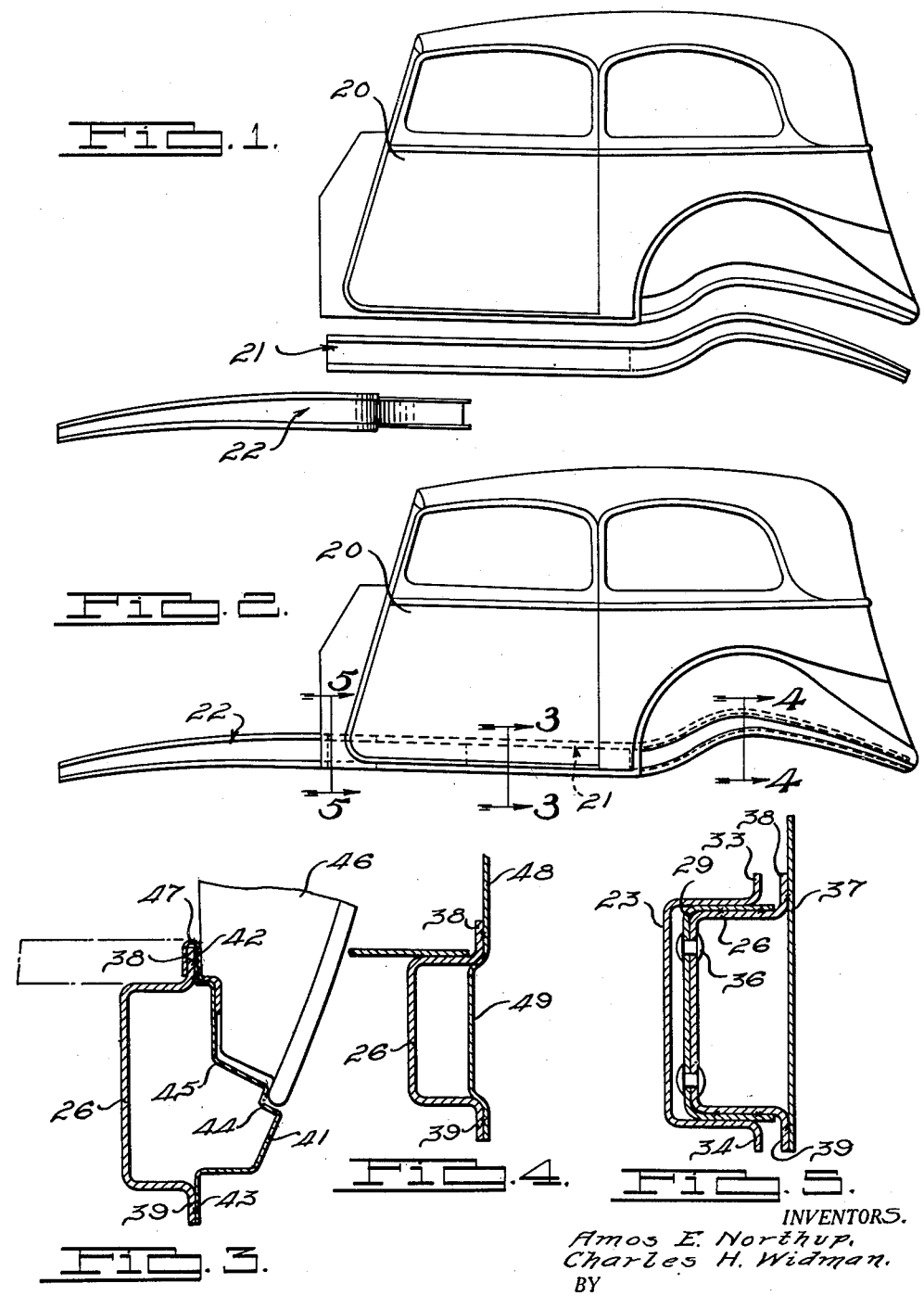
INVENTORS.
Amos E. Northup.
Charles H. Widman.
BY
Harness, Dickey, Pierce & Hann.
ATTORNEYS.

Nov. 2, 1937.  A. E. NORTHUP ET AL  2,097,699
METHOD OF CONSTRUCTING VEHICLE BODIES
Filed June 2, 1933  2 Sheets-Sheet 2
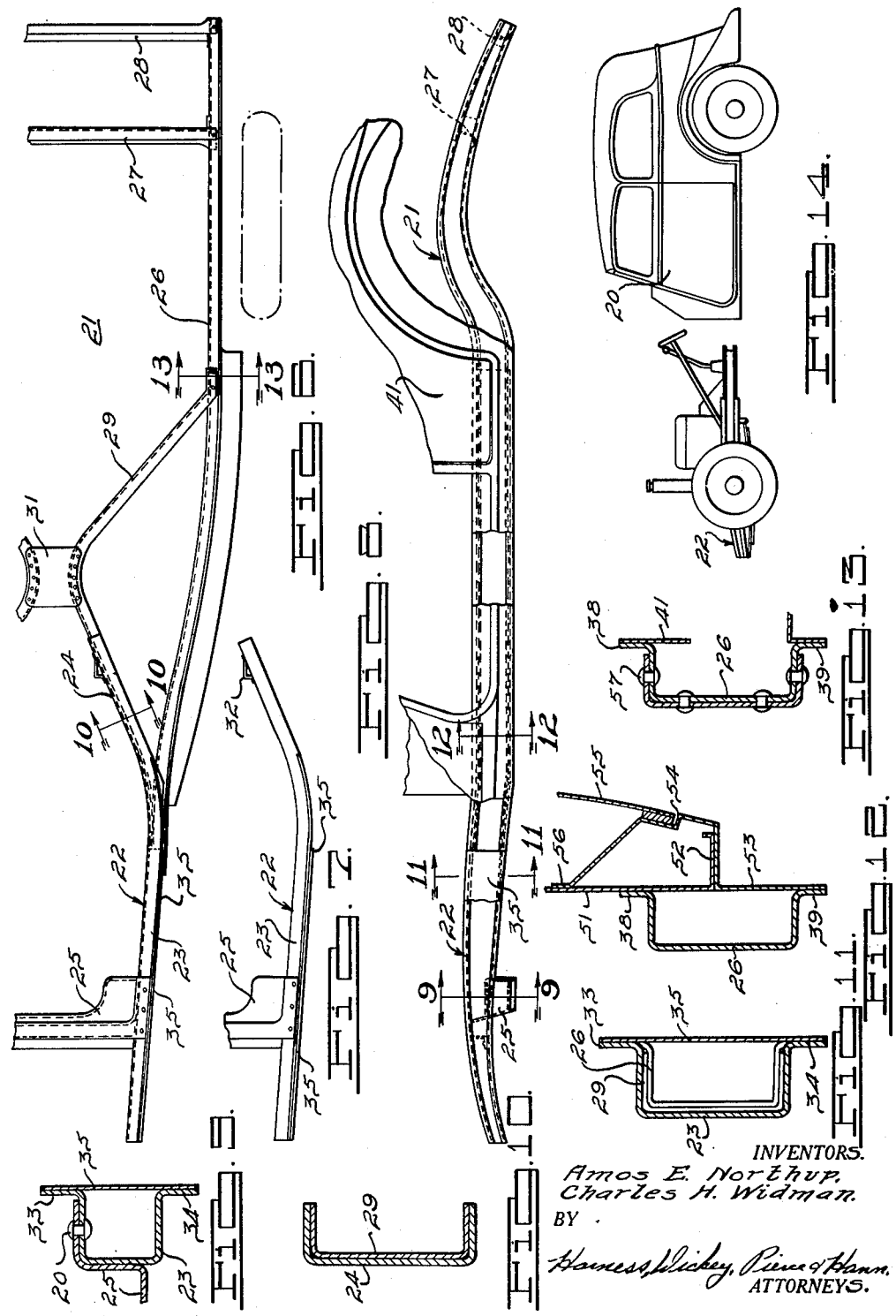
INVENTORS.
Amos E. Northup,
Charles H. Widman.
BY
Harness, Dickey, Pierce & Hann.
ATTORNEYS.

Patented Nov. 2, 1937

2,097,699

UNITED STATES PATENT OFFICE 2,097,699

METHOD OF CONSTRUCTING VEHICLE BODIES

Amos E. Northup, Pleasant Ridge, and Charles H. Widman, Detroit, Mich., assignors to The Murray Corporation of America, a corporation of Delaware Application June 2, 1933, Serial No. 673,932

11 Claims. (Cl. 296—28)

Our invention relates to automotive vehicle constructions and particularly the automobile body and chassis construction wherein the chassis is separable near the front terminal end of the body to reduce the overall dimension of the vehicle for shipping purposes and for separating the engine from the vehicle body so that it may be readily worked upon.

In the co-pending application of C. W. Avery, Serial No. 667,362, filed April 22, 1933, and assigned to the assignee of the present invention, an automotive vehicle construction was illustrated, described and claimed wherein a chassis frame was employed which was separable near the front terminal end of the body.

In practicing our present invention, we produce the same novel features as in the above-mentioned application by a different type of construction, that wherein the chassis frame is embodied with an X-member of the type conventionally employed in the art and wherein the longitudinal members of the chassis frame are constructed of outwardly presenting channel sections forming box section structure with the body panels. The complete X-member on the chassis frame provides strength thereto as also does the box section structure formed on the longitudinal members thereof.

The main objects of our invention are: to provide an automobile having a chassis which is separable at the front terminal end of the body to reduce the overall length of the vehicle for shipping purposes; to provide a vehicle chassis construction having an X-member disposed medially of the ends of the chassis frame intermediate the longitudinal side members; to secure a body directly to the rear section of the chassis frame; to unite the body at its bottom edge to the longitudinal members of the rear chassis section in such manner as to form a box section structure therewith; to eliminate the sills conventionally employed on bodies by directly securing the body to the chassis frame; and, in general, to simplify the body and chassis construction by securing the body directly to the chassis frame and having the chassis frame separable near the front terminal end of the body.

Other objects and features of novelty of our invention will be either specifically pointed out or will become apparent when referring, for a better understanding of our invention, to the following description taken in conjunction with the accompanying drawings, wherein:

Figure 1 is an exploded view, in elevation, of a vehicle body and chassis frame embodying features of our invention, Fig. 2 is a view, in elevation, of the structure illustrated in Fig. 1, when in assembled relation, Fig. 3 is an enlarged sectional view of the structure illustrated in Fig. 2, taken on the line 3—3 thereof, Fig. 4 is an enlarged sectional view of the structure illustrated in Fig. 2, taken on the line 4—4 thereof, Fig. 5 is an enlarged sectional view of the structure illustrated in Fig. 2, taken on the line 5—5 thereof, Fig. 6 is a broken plan view of our chassis construction when in assembled relation, Fig. 7 is a broken plan view of the front section of the automobile chassis frame illustrated in Fig. 6, Fig. 8 is a broken view in elevation of the structure illustrated in Fig. 6, Fig. 9 is an enlarged sectional view of the structure illustrated in Fig. 8, taken on the line 9—9 thereof, Fig. 10 is an enlarged sectional view of the structure illustrated in Fig. 6, taken on the line 10—10 thereof, Fig. 11 is an enlarged sectional view of the structure illustrated in Fig. 8, taken on the line 11—11 thereof, Fig. 12 is an enlarged sectional view of the structure illustrated in Fig. 8, taken on the line 12—12 thereof, Fig. 13 is an enlarged sectional view of the structure illustrated in Fig. 6, taken on the line 13—13 thereof, and Fig. 14 is a view of an automobile embodying features of our invention with the front section of the chassis frame separated from the body section thereof.

While the broad principles of construction in the present application follow the inventive concept embodied in the above-mentioned co-pending application, the present invention, while not necessarily an improvement over the type of construction disclosed and described therein, illustrates another form which the chassis section may assume to attain the desirable separable chassis structure.

Referring to Fig. 1, we have illustrated a body 20 preferably of all metal construction, although composite bodies may be employed. The body is in the nature of a shell, having the sills eliminated therefrom, which is joined to a rear section of a chassis frame 21 which constitute the sills of the body. The chassis frame terminates substantially at the front end of the body and is so formed as to engage the rear end of a front chassis section 22, in a manner which will be explained more fully hereinafter. In Fig. 2, the body is shown welded or otherwise secured to the chassis section 21 with the front chassis section 22 releasably or otherwise secured thereto.

Referring to Figs. 6, 7, and 8, we have illustrated in detail the chassis construction wherein the front section 22 embodies the longitudinally extending side members 23 which are inwardly converging, at 24, toward the center line of the vehicle. A cross brace 25 retains the side members 23 in united relation and constitutes a portion of the engine mounting. In Figs. 6 and 7, we have illustrated only the left hand side of the chassis frame, it being understood that the right hand side is the same as the left hand side, except for the opposite hand relationship.

The rear chassis section is composed of the longitudinally extending members 26 which slightly converge inwardly toward the center line of the car, to engage the members 23 to form a continuation of the longitudinally extending portion thereof. Rear braces 27 and 28 extend across the rear end of the longitudinally extending members 26 to unite the two members at the rear end to form a support for the body, the gas tank and the spring shackle. An X-member 29 joins the front and central portions of the longitudinal members 26 in a conventional manner. The X-member 29 is composed of two V-shaped channel elements which are joined by gusset plates 31 forming a hollow opening through which the propeller shaft may extend.

The front section 22 may be bolted to the rear section 21 so that it may be released therefrom to permit the engine portion and front wheels of the vehicle to be separated from the body and rear portion so that the engine may be worked upon separate from the body. It is to be understood that when a permanent connection is desired after shipment, the front section 22 may be welded, riveted or otherwise secured directly to the rear section 21. The front section is provided with engine mounting means including the brackets 32 so that the engine is entirely carried on the front section and will separate from the body section for the purpose of shipping or repair.

The longitudinally extending members 23 of the front chassis section 22, are illustrated in Figs. 9, 10 and 11 as being of outwardly presenting channel section. Upwardly and downwardly projecting flanges 33 and 34 respectively, are illustrated in Fig. 9, to which an element 35 is secured to form a box section structure and a finish to the outer surface of the elements 23. The cross brace 25 is riveted, at 20, or welded or otherwise secured to the elements 23 as illustrated in the figure. The inwardly converging portion 24 is constructed to encompass the X-member 29 which is likewise of outwardly presenting channel section. A tight joint is formed between the elements and the X-member to eliminate any play between the sections when they are secured together.

In Fig. 11, we have illustrated a section of the element 23 just ahead of the joinder of the longitudinal member 26 and the X-member 29, to illustrate the nesting relation of the outwardly presented channel sections. The longitudinally extending member 26 is nested within the X-member 29 which itself is nested within the longitudinal element 23 of the front chassis section 22.

In Fig. 3, we have illustrated a section through the chassis frame at the door opening wherein the longitudinally extending member 26 has a body paneling 41 secured thereto by upwardly extending and downwardly extending flanges 42 and 43 which mate with the flanges 38 and 39 on the member 26. A box section structure is formed below the door opening by this construction. The panel 41 is provided with rabbets 44 and 45 in which a door 46 mates to form a sealed construction, as illustrated in the figure.

In Fig. 4, a section of the body and chassis is illustrated at the wheel housing wherein the paneling 48, forming the side of the wheel housing, is welded to the flanges 38 and 39, the section of the housing being inwardly pressed at 49 in the channel of the element 26. The box section structure formed by this construction materially strengthens the chassis sections. In Fig. 12, we have illustrated a section of the chassis frame directly in front of the door opening wherein the dash panel 51 is welded to the flange 38 and is outwardly projected at 52 to be welded to a panel section 53 which is also welded to the flange 39 of the longitudinally extending element 26. The panel 53 is rabbeted at 54 for receiving a hood 55 and is inwardly formed and upwardly flanged, at 56, and welded to the dash panel 51. A box section structure formed in this manner, strengthens the chassis section 26 and the dash panel 51 as well as the body paneling 53.

In Fig. 13, we have illustrated a section through the chassis frame at the point where the X-member 29 is joined thereto to illustrate the connection which is effected by the rivet 57, although it is to be understood that welding or other suitable connecting means may be employed for joining the X-member to the longitudinally extending member 26. The paneling 41 is joined to the longitudinally extending member at this point by being welded or otherwise secured to the flanges 38 and 39 of the member 26.

The body is assembled upon the chassis section 21 while it also has attached thereto the driven element, including the differential, springs and wheels. The engine and transmission along with the steering equipment, springs and front wheels, are mounted on the front chassis section 22. Such mounting is clearly illustrated in Fig. 14. The automotive vehicle so constructed may be mounted in crates, in freight cars, or in the holds of vessel, with the front and rear sections separated to reduce the space required by the vehicle. The engine and chassis section 22 may be disposed under the chassis section 21 with the engine within the body of the vehicle. The rear and front wheels are removed and may be stored within the vehicle or adjacent thereto along with the fenders, radiators, lamps and other parts of the automobile. Such assembly is illustrated in the above-mentioned co-pending application.

It is to be understood that the section 22 may be secured to section 21 in a permanent manner by welding after shipment or the two sections may be bolted together so that they may be separated for the purpose of repair. In the latter arrangement, the front section may be removed from the body to have the engine exposed so that it may be readily worked upon.

While we have described and illustrated but a single embodiment of our invention, it will be apparent to those skilled in the art that various changes, omissions, additions and substitutions may be made therein without departing from the spirit and scope of our invention, as set forth in the accompanying claims.

We claim as our invention:

1. In a motor vehicle, a chassis frame having outwardly presenting channel sections as a separate element of the vehicle, a plurality of panel elements secured together to form a body and directly attached to the chassis frame to form box sections with the outwardly presented channel sections thereof, and means on the inner faces of said frame for providing a support for the driving means for the vehicle.

2. In a motor vehicle, a chassis frame of separable front and rear sections constructed from side elements of outwardly presenting channel section, and a body secured to the rear section forming a box section with said channel elements.

3. In a motor vehicle a chassis frame of separable front and rear sections formed of outwardly presenting channel elements, a body welded directly to the rear section forming a unit construction therewith and constituting a box section with the elements.

4. A motor vehicle body and chassis assembly including, in combination, sills for said body of outwardly presented channel shape to which the body paneling is secured to form box section structure, said sills constituting the rear portion of a chassis frame, and a separable extension for said sills forming therewith a complete chassis frame.

5. A motor vehicle having a body mounted on a frame which terminates near the front end of the body and secured to the frame in such manner as to form a box section construction therewith, a front section of a chassis frame of outwardly presenting channel elements which are likewise covered by paneling to form box section structure which frame is releasably securable to the first said frame to form a complete chassis frame therewith, and an engine mountable on said front section which is separable therewith from the body and first said frame.

6. The combination with a motor vehicle, of a separable chassis frame constructed of outwardly projecting channel sections, a body mounted on the rear section of said frame forming box section structures with said channel elements, an engine mounted on the front section of said frame, the rear portion of said front frame and the front portion of said rear frame having complementary shapes by which they are mated with each other to form a unit frame.

7. The combination with a motor vehicle, of a chassis frame comprising a front and rear section constructed of outwardly presented channel elements, the rear portion of said front section and the front portion of said rear section being constructed of complementary form by which the sections are united to form a unit chassis frame, and a body mounted on said rear section independent of said front section and so secured to said elements as to form box section structure therewith.

8. The combination with a motor vehicle, of a chassis frame comprising a front and rear section made up of elements of outwardly presenting channel shape flanged at their ends in a plane parallel to the plane of the web of said section, the rear portion of said front section and the front portion of said rear section having complementary form by which they are united to constitute a unit chassis frame, and a body mounted on said rear section independent of said front section and secured to the flanged edges of said channel elements to form box section structure therewith.

9. A sectional chassis frame including, in combination, a rear and front unit having longitudinally disposed elements of outwardly presenting channel section, and an angularly disposed portion on one of said units, an X-member on the other of said units which is engaged by said angularly disposed portion to securely brace the elements to form a complete chassis frame.

10. A sectional chassis frame including, in combination, a rear and a front section having longitudinally and transversely disposed elements, an angularly disposed portion on the rear end of the front section, an X-member disposed between the longitudinally extending members of the rear section, a portion of which is engaged by said angularly disposed portion of the front unit to provide bracing for the sections when they are joined together to form a complete chassis frame.

11. A pressed metal vehicle body construction comprising a unitary stamping containing a door opening and including the threshold of the door, the stamping affording exterior walls giving contour to the body and an outer generally upwardly extending threshold wall lying inwardly of the outer contour walls of the stamping, said upwardly extending threshold wall being inclined downwardly and outwardly from its upper edge substantially to the outer contour wall of the stamping and from the latter region being projected inwardly, together with a complemental inner stamping interconnecting the upper edge of said threshold wall and the said inward projection of its lower portion whereby to form a box section sill structure.

AMOS E. NORTHUP.
CHARLES H. WIDMAN.